April 7, 1931.  G. G. SHOER  1,799,395
COMBINED COAT AND HAT HOOK
Filed March 7, 1930
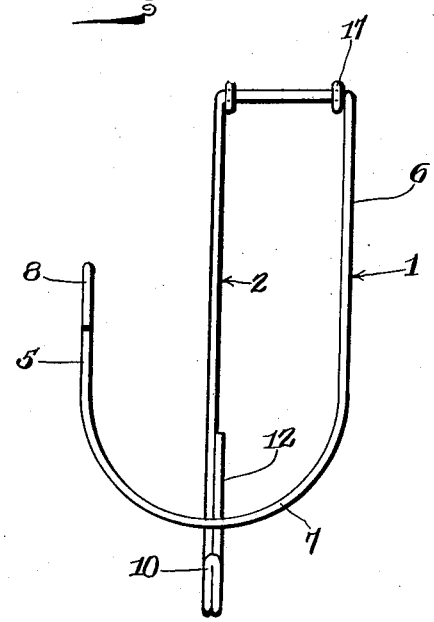
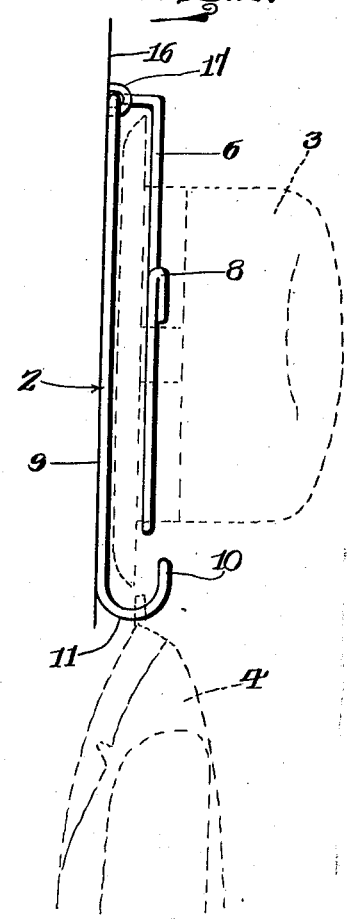
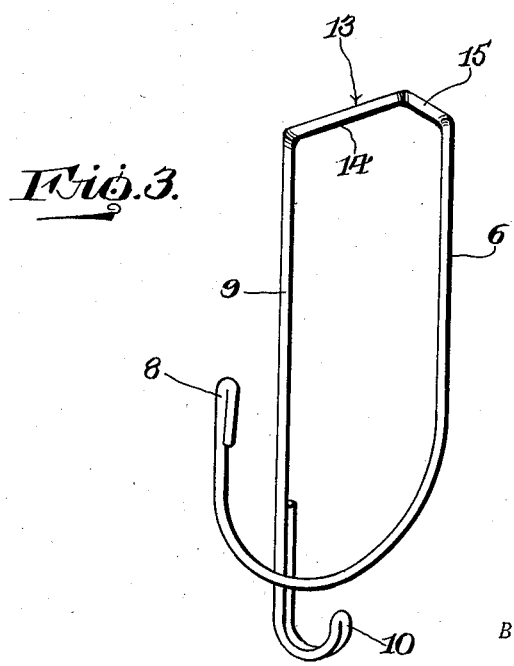
INVENTOR.
George G. Shoer
BY
Geo. P. Kimmel
ATTORNEY.

Patented Apr. 7, 1931

1,799,395

UNITED STATES PATENT OFFICE

GEORGE G. SHOER, OF CLEVELAND, OHIO, ASSIGNOR OF ONE-THIRD TO JOHN L. ZULLI AND ONE-THIRD TO PHILLIP SAGINOR, SR., BOTH OF CLEVELAND, OHIO

COMBINED COAT AND HAT HOOK

Application filed March 7, 1930. Serial No. 434,063.

This invention relates to a combined coat and hat hook, and has for its object to provide, in a manner as hereinafter set forth, a hook of the class referred to which is simple in its construction, strong, durable, compact, thoroughly efficient in its use, permitting of the convenient positioning of a coat and hat thereon, and inexpensive to manufacture.

A further object of the invention is to provide, in a manner as hereinafter set forth, a hook of the class referred to so constructed and arranged for supporting a hat and coat in spaced relation with respect to each other, and further to enable the convenient removal of one without interfering with the other or without obstruction from the other.

With the foregoing and other objects in view the invention consists of the novel construction, combination and arrangement of parts as hereinafter more specifically described, and illustrated in the accompanying drawing, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a front elevation of a combined coat and hat hook in accordance with this invention.

Figure 2 is a side view thereof, and further illustrating in dotted lines a coat and hat supported from the hook.

Figure 3 is a perspective view of the hook.

A combined coat and hat hook in accordance with this invention is formed from a single length of cylindrical stock of the desired gauge, and it includes a hat support referred to generally at 1 and a hook member for a coat, and such member is referred to generally at 2. In Figure 2 a hat is shown in dotted lines and indicated at 3 and which is mounted in position to be supported by the hat support 1. Figure 2 also illustrates in dotted lines a coat and which is indicated at 4. The coat is illustrated as suspended from the hook member 2.

The hat support 1 comprises a pair of arms 5, 6 and a curved coupling portion 7 between the arms 5, 6. The arm 5 is of less length than the length of the arm 6 and is formed with a free end bent upon itself as at 8 for the purpose of reinforcing such end.

The hook member 2 comprises an arm or shank 9, an arm or bill 10 and a curved coupling portion 11 between the arms 9, 10. The arm 9 is of materially greater length than the arm 10. The material or stock is bent upon itself as at 12 to increase the width of the lower portion of the arm 9, the coupling portion 11 and the arm or bill 10.

The hook further includes a coupling part referred to generally at 13 and consisting of a pair of arms 14, 15, the latter being of less length than the former and disposed at right angles with respect thereto. The inner end of the arm 15 merges into the inner end of the arm 14. The outer end of the arm 14 merges into the upper end of the arm or shank 9. The outer end of the arm 15 merges into the upper end of the arm 6. The arm 15 projects outwardly with respect to the arm 14 and offsets the support 1 with respect to the hook member 2.

The arm or shank 9 is disposed centrally with respect to the support 1. The arm or shank 9 is of greater length than the arm 6 of support 1. The coupling portion 7 of the support 1 is of materially greater width than the coupling portion 11 of the hook member 2. The arm 5 of support 1 is of greater length than the arm or bill 10 of the hook member 2.

The arms 5 and 6 of the support 1 constitute a retaining means for the hat 3, as such arms 5 and 6, when the hat 3 is mounted on the support 1, are arranged forwardly of the brim of the hat. The coupling portion 7 supports the crown of the hat at a point in proximity to the junction of the crown to the brim. The coupling portion 7 is arranged a substantial distance above the arm or bill 10 of the hook member 2.

The coat 4 is adapted to be supported from the coupling portion 11 of the hook member 2, and it is releasably retained on such coupling portion 11 by the arm or bill 10.

The support 1 is of hook-like form. The member 2 is of hook-like form, but the support 1 is of greater width and of less height than hook member 2 and is disposed in a plane at right angles to the plane of the hook member 2. The hook member 2 is disposed centrally with respect to the support 1 but arranged rearwardly in spaced relation with respect to the latter. The hook is secured to a support 16 by holdfast devices 17 which are mounted on the arms 14 of the coupling portion 13. The holdfast devices 17 are in the form of screws provided with eyes for the passage of the arm 14. The hook is so constructed as to enable the convenient connecting therewith and removal therefrom of the coat and hat. Further, when the coat and hat are connected therewith the hat is arranged above the coat in spaced relation, and one can be removed without obstruction from the other.

It is thought the many advantages of a combined coat and hat hook in accordance with this invention can be readily understood, and although the preferred embodiment of the invention is as illustrated and described, yet it is to be understood that changes in the details of construction can be had which will fall within the scope of the invention as claimed.

What I claim is:

1. A combined coat and hat hook comprising a coupling portion including a pair of arms, one extending at right angles from one end of and of less length than the other, a depending, hook-shaped hat support having one end integral with the outer end of said short arm, a depending coat suspending element of hook-like form having one end integral with the other end of said long arm and spaced rearwardly of said support centrally of the latter, said element depending below said support, said element and support extending in different planes.

2. A combined coat and hat hook comprising a coupling portion including a pair of arms, one extending at right angles from one end of and of less length than the other, a depending, hook-shaped hat support having one end integral with the outer end of said short arm, and a depending coat suspending element of hook-like form having one end integral with the other end of said long arm and spaced rearwardly of said support centrally of the latter, said element depending below said support, said element and support extending in different planes, the free end terminal portions of said element and support being reinforced.

3. A combined coat and hat hook comprising a hat support formed of a pair of spaced arms connected together by a curved coupling portion, one of said arms being of greater length than the other, a coat suspending element formed of a shank and a bill connected together by a curved coupling portion of materially less length than the said other coupling portion, said shank being of greater length than the long arm of said support, arranged rearwardly of, spaced from and centrally with respect to the coupling portion of said support, and coupling means formed of a short and a long arm disposed at right angles with respect to each other and with such short arm projecting outwardly from the long arm, the short arm of said coupling means merging into the upper end of the long arm of said support and the long arm of said coupling means merging into the upper end of said shank, said element depending below said support.

4. A combined coat and hat hook comprising a hat support formed of a pair of spaced arms connected together by a curved coupling portion, one of said arms being of greater length than the other, a coat suspending element formed of a shank and a bill connected together by a curved coupling portion of materially less length than the said other coupling portion, said shank being of greater length than the long arm of said support, arranged rearwardly of, spaced from and centrally with respect to the coupling portion of said support, and coupling means formed of a short and a long arm disposed at right angles with respect to each other and with such short arm projecting outwardly from the long arm, the short arm of said coupling means merging into the upper end of the long arm of said support and the long arm of said coupling means merging into the upper end of said shank, said element depending below said support, said element reinforced at its lower portion and the short arm of said support reinforced at its free end.

In testimony whereof, I affix my signature hereto.

GEORGE G. SHOER.